United States Patent
Bareiss

[19]

[11] Patent Number: 5,474,247
[45] Date of Patent: Dec. 12, 1995

[54] BELT RETRACTOR FOR VEHICLE SAFETY BELTS

[75] Inventor: Rainer Bareiss, Alfdorf-Voggenberg, Germany

[73] Assignee: TRW Repa GmbH, Alfdorf, Germany

[21] Appl. No.: 344,460

[22] Filed: Nov. 23, 1994

[30] Foreign Application Priority Data

Nov. 30, 1993 [DE] Germany .......................... 93 18 286.4

[51] Int. Cl.⁶ .................................................. B60R 22/35
[52] U.S. Cl. .................................................. 242/382.2
[58] Field of Search ............................ 242/382.2, 382.1, 242/382.4; 280/806, 807; 297/476, 478

[56] References Cited

U.S. PATENT DOCUMENTS

| | | |
|---|---|---|
| 4,583,701 | 4/1986 | Matsui et al. . |
| 4,726,539 | 2/1988 | Schmidt et al. . |
| 4,729,524 | 3/1988 | Befort et al. . |
| 4,747,562 | 5/1988 | Tsukamoto et al. . |
| 4,749,143 | 6/1988 | Tsukamoto et al. . |
| 4,809,926 | 3/1989 | Koike . |
| 4,811,912 | 3/1989 | Takada . |
| 4,915,321 | 4/1990 | Asfour . |
| 4,948,066 | 8/1990 | Matsumoto et al. .................. 242/382.2 |

FOREIGN PATENT DOCUMENTS 3809007 10/1988 Germany .

Primary Examiner—John M. Jillions
Attorney, Agent, or Firm—Tarolli, Sundheim & Covell

[57] ABSTRACT

The safety belt retractor comprises a frame, a belt drum rotatably supported in the frame, a locking mechanism for selectively locking the belt drum against rotation and a trip mechanism for activation of the locking mechanism. The trip mechanism has an externally toothed control disk mounted for limited relative rotation on the belt drum. A two-armed toggle lever is selectively pivotable on the frame between two stable positions. A planet wheel gearing has a sun wheel connected to the belt drum, an internally toothed ring gear fixed to the frame and a pair of planet wheels meshing with the sun wheel and the ring gear. The planet wheels have a peripheral toothing with an oversized tooth which extends radially beyond the toothing of the planet wheel. The toggle lever has one arm provided with an engagement member for engagement in the toothing on the control disk. Each oversized tooth directly urges on a different one of the toggle lever arms to pivot the lever from one to the other of the two stable positions in a predetermined orbital and rotational position of the respective planet wheel.

3 Claims, 2 Drawing Sheets

BELT RETRACTOR FOR VEHICLE SAFETY BELTS

The present invention relates to a belt retractor for vehicle safety belts and more particularly to a belt retractor with a locking mechanism which can be switched over between an emergency locking function and an automatic locking function.

Such a belt retractor of the general type disclosed in the patent publication DE 3,809,007 C2 comprises a locking mechanism for locking the belt drum supported in a housing. For actuating the locking mechanism a trip mechanism is provided, which possesses a toothed control disk able to rotate to a limited extent in relation to the belt drum and by whose rotation in relation to the belt drum the locking mechanism is activated. For the activation of the child securing means a lever-shaped switching element is provided, which is able to be switched over between two stable positions of switching and in the first position thereof activates the locking mechanism and in the second switching position releases the locking mechanism. The switching over of the switching element between the two settings takes place in a fashion dependent on the amount of belt webbing wound up on the belt drum since the rotation of the belt drum is stepped down by means of planetary gearing and is converted into the desired switching strokes.

The planetary gearing comprises a sun wheel connected with the belt drum in such a manner as to prevent relative rotation, a ring gear fixed to the housing and a planet wheel having external gear teeth and which is in engagement with the sun wheel and with the ring gear.

In the case of the known belt retractor a switching cam is formed on the planet wheel, which at a certain position of orbiting and rotation of the planet wheel corresponding to a predetermined diameter of the coil of belt webbing on the belt drum presses against one of two plungers, which for its part acts on the switching element moving the same into its respectively other switching setting. In another position of orbiting and rotation, which corresponds to a smaller diameter of the coil of wound belt webbing, the switching cam of the planet wheel makes contact with the second plunger by which the switching element is then moved back again. The switching element acts on a control lever, by which the locking pawl of the locking mechanism is actuated.

One object of the invention is to provide a belt retractor of the type mentioned above, while maintaining substantially the same function, with a simpler and more compact structure.

In order to achieve this aim the switching element is provided in the form of a switching rocker pivotally mounted on the housing and which possesses two actuating arms and a switching pawl, which in the first switching setting acts on the control disk and holds the same preventing rotation and the external teeth of the planet wheel comprises at least one switching tooth which is oversize in the radial direction and which in a predetermined position of orbiting movement and rotation of the planet wheel comes into direct engagement with one of the actuating arms of the switching rocker and thrusts the same into its respectively other switching setting. Owing to the switching tooth formed on the planet wheel the operation of the switching rocker may take place directly so that transmission elements as present in current systems, such as plungers, are no longer necessary. At the same time there is no need for a separate switching cam on the planet wheel, by which the height of the planet wheel and consequently the overall axial size of the belt retractor would be increased. Since furthermore the switching rocker with the locking pawl formed thereon directly engages the control disk of the vehicle and the belt webbing sensitive actuating mechanism, it is possible to do without a separate control lever.

In a preferred embodiment of the belt retractor two planet wheels are provided which are offset in the peripheral direction in relation to one another and which respectively have a switching tooth, the first planet wheel coming into engagement in a predetermined position of orbiting movement and rotation thereof with the one actuating arm of the switching rocker whereas the second planet wheel comes into engagement in a second predetermined position of orbiting movement and rotation thereof with the other actuating arm of the switching rocker. Thus one planet wheel serves for activating the child securing means and the other for inactivating the same. The respective switching points may in this manner be simply reset. In the preferred embodiment of the belt retractor furthermore the position of rotation of the switching tooth is offset on each planet wheel after each complete orbiting movement by the size of pitch of its teeth or a multiple thereof. After each orbiting movement of the planet wheel its switching tooth is consequently offset through a certain angle so that it is possible to exactly calculate after which number of orbiting movements it will strike the actuating arm of the switching rocker.

Further advantageous developments and convenient forms of the invention will be understood from the following detailed descriptive disclosure of one embodiment thereof in conjunction with the accompanying drawings.

Figure 1:
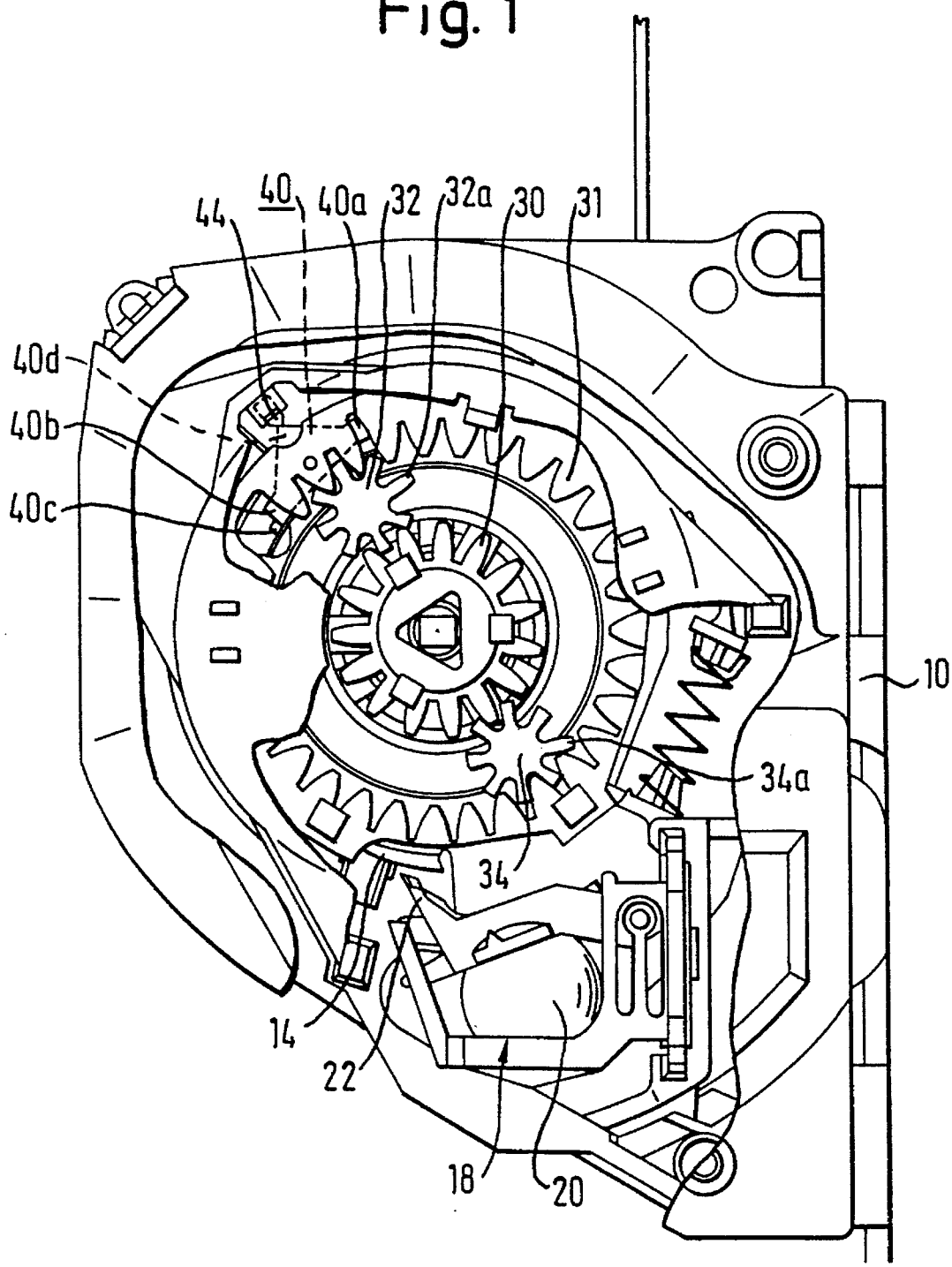
FIG. 1 is a diagrammatic lateral elevation of the belt retractor, in which some parts are shown broken away.
Figure 2:
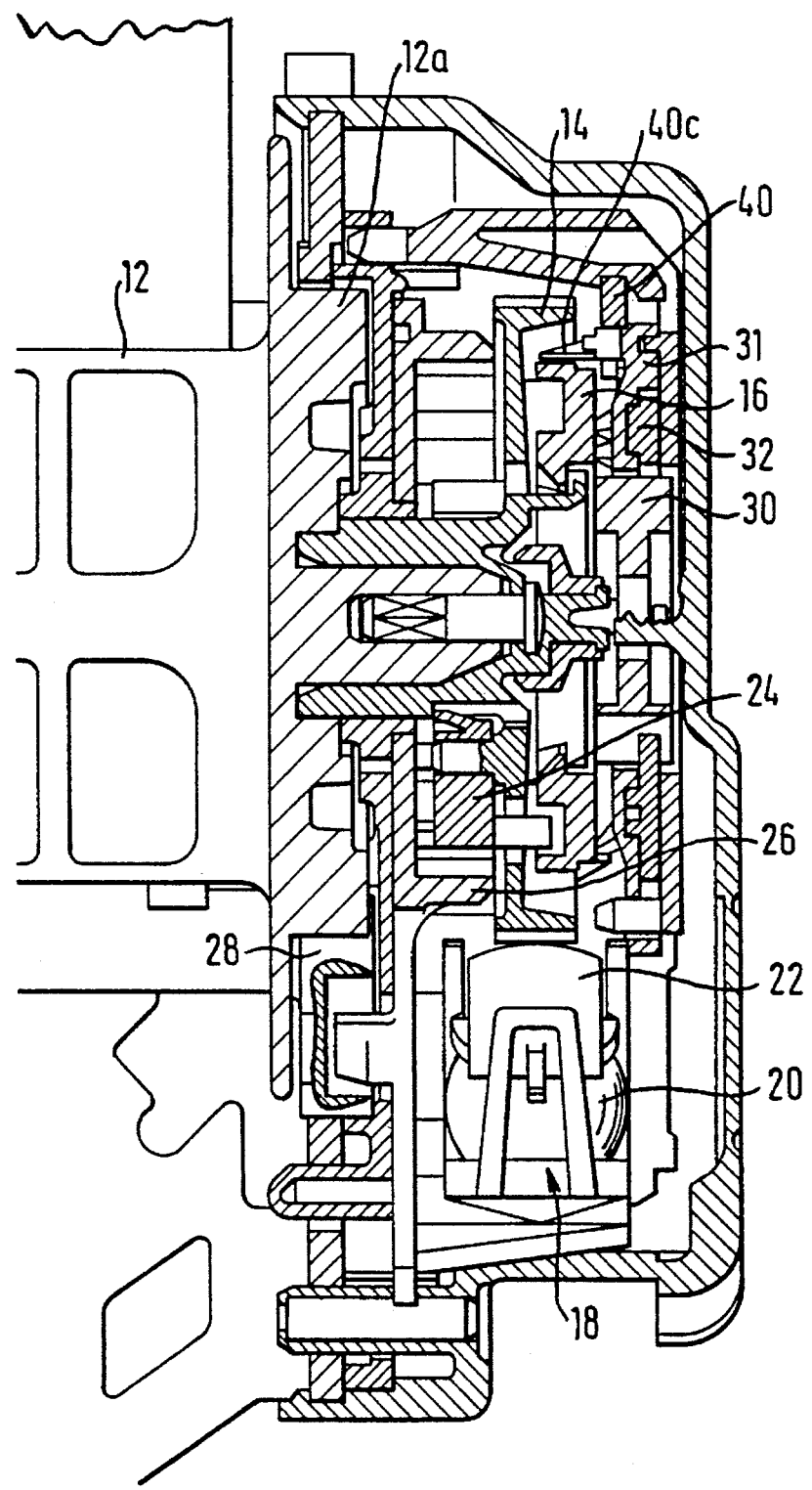
FIG. 2 is a diagrammatic section through the axis of the belt retractor depicted in FIG. 1.

Between the two limbs of a U-shaped housing 10 a belt drum 12 is rotatably mounted. On a lateral flange 12a of the belt drum 12 an externally toothed coupling disk 14, on which an externally toothed control disk 16 is coupled for limited rotary movement, is connected in such a known manner as to prevent relative rotation. A vehicle sensitive trip mechanism pivotally mounted on the housing 10 and which is generally referenced 18 in the figures, comprises a control pawl 22 resting on a ball 20. On a vehicle responsive movement of the ball taking place this pawl comes into engagement with the external teeth of the coupling disk 14. Owing to the rotary movement of the coupling disk 14 the trip mechanism 18 is pivoted in order in a familiar fashion to activate a locking pawl 28, which then comes into engagement with external teeth on the flange 12a of the belt drum and locks the same to prevent rotation. The same locking operation is initiated in a manner responsive to the belt webbing by means of the control disk 16 which owing to its moment of inertia opposes a rapid rotary acceleration so that there will be relative rotation between the belt drum 12 and the control disk 16 which is transmitted via a coupling pawl 24 and a control lever 26 to the locking pawl 28.

In order to secure a child's seat in the vehicle it is possible for the belt retractor to be put in the locked condition by drawing out a certain length of belt webbing. After the belt webbing has been nearly completely wound up again, the belt retractor is switched back into the locked mode responsive to the vehicle and to the belt webbing. The rotation of the belt drum consequently has to be converted into switching strokes, that is to say a switching on stroke for turning on the locking mechanism with the belt webbing practically completely unwound, and a switching off stroke with the belt webbing practically completely wound up again. For this purpose planetary gearing is provided, which includes a sun wheel 30 connected in such a manner as to prevent relative rotation with the flange 12a of the belt drum 12, an internally toothed ring gear 31 secured to the housing 10, and two externally toothed planet wheels 32 and 34 offset in relation to each other by 180°, which planet wheels are in mesh with the sun wheel 30 and the ring gear 31. The planet wheels 32 and 34 respectively have eight teeth, of which seven are made blunt and the respective eighth one is designed in a radially extended form as a switching tooth 32a and, respectively, 34a.

A switching rocker 40 designed in the form of a double armed lever, is pivotally mounted on a pin secured to the housing and of its two actuating arms the actuating arm 40b is provided with a switching pawl 40c formed thereon. The switching pawl 40c is, dependent on the position of switching of the switching rocker 40, either out of or in engagement with the external teeth on the inertia disk 16. When the switching pawl 40c is in engagement with the external teeth of the control disk 16, it will hold the same to prevent rotation thereof so that relative rotation between the belt drum 12 and the control disk 16 will cause the locking mechanism of the belt retractor to be activated in the fashion described above. The geometry of the teeth on the control disk 16 on the one hand and of the switching pawl 40c on the other hand is however so selected that a rotation of the belt drum is possible in the wind up direction.

Between its two actuating arms the switching rocker 40 bears a spur 40d, which cooperates with a spring-loaded thrust member 44 in order to hold the switching rocker 40 bistably in either the one or the other of two possible positions of switching.

At positions opposite to the actuating arms 40a and 40b of the switching rocker 40 the ring gear 31 is provided with a respective gap, through which the switching teeth 32a and, respectively, 32b may thrust against the respective actuating arm of the switching rocker 40, when they are in appropriate orbital and rotational positions. In FIG. 1 it can be assumed that, given suitable positions of orbiting and rotary movement of the planet wheel 32, the switching tooth 32a will push against the actuating arm 40a of the switching rocker in order to bring the switching pawl 40c into mesh with the peripheral teeth of the control disk 16; by means of the switching tooth 34a, on the other hand, when the planet wheel 34 is in a suitable position of orbiting and rotary movement it will be pressed against the actuating arm 40b of the switching rocker 40 in order to move the switching rocker back into the initially adopted position thereof.

The tooth pitches of the sun wheel 30, of the ring gear 31 and of the planet wheels 32 and 34 are so selected that after each completed orbit of a planet wheel its switching tooth 32a and, respectively, 34a will be offset by an amount equal to the pitch of its teeth. Owing to this design it is readily possible to set the switching points, which are to be selected dependent on the amount of belt webbing wound up and, respectively, unwound, for the activation and deactivation of the locking mechanism.

What is claimed is:

1. A safety belt retractor comprising a frame, a belt drum rotatably supported in said frame, a locking mechanism for selectively locking said belt drum against rotation, a trip mechanism for activation of said locking mechanism, said trip mechanism having an externally toothed control disk mounted for limited relative rotation on said belt drum, a two-armed toggle lever selectively pivotable on said frame between first and second stable positions, and a planet wheel gearing with a sun wheel connected to said belt drum, an internally toothed ring gear fixed to said frame and at least one planet wheel meshing with said sun wheel and said ring gear, said planet wheel having a peripheral toothing with at least one oversized tooth which extends radially beyond said toothing, said toggle lever having an engagement member for engagement in said toothing on said control disk when said toggle lever is in one of said two stable positions, and said oversized tooth directly urging on one or the other arm of said toggle lever to pivot said lever from one to the other of said two stable positions in a predetermined orbital and rotational position of said planet wheel.

2. The belt retractor of claim 1, wherein a pair of planet wheels are provided which are shifted against each other in peripheral direction of said ring gear, each planet gear having a peripheral toothing with an oversized tooth which extends radially beyond said toothing, and each of said oversized teeth being operatively associated with a different one of said toggle lever arms.

3. The belt retractor of claim 1, wherein said oversized tooth assumes a rotational position after each completed orbit which is shifted from a preceeding rotational position by an entire number of toothing pitches.

\* \* \* \* \*